(No Model.) 6 Sheets—Sheet 1.
A. G. ANDERSON.
BUTTONHOLE SEWING MACHINE.
No. 565,713. Patented Aug. 11, 1896.
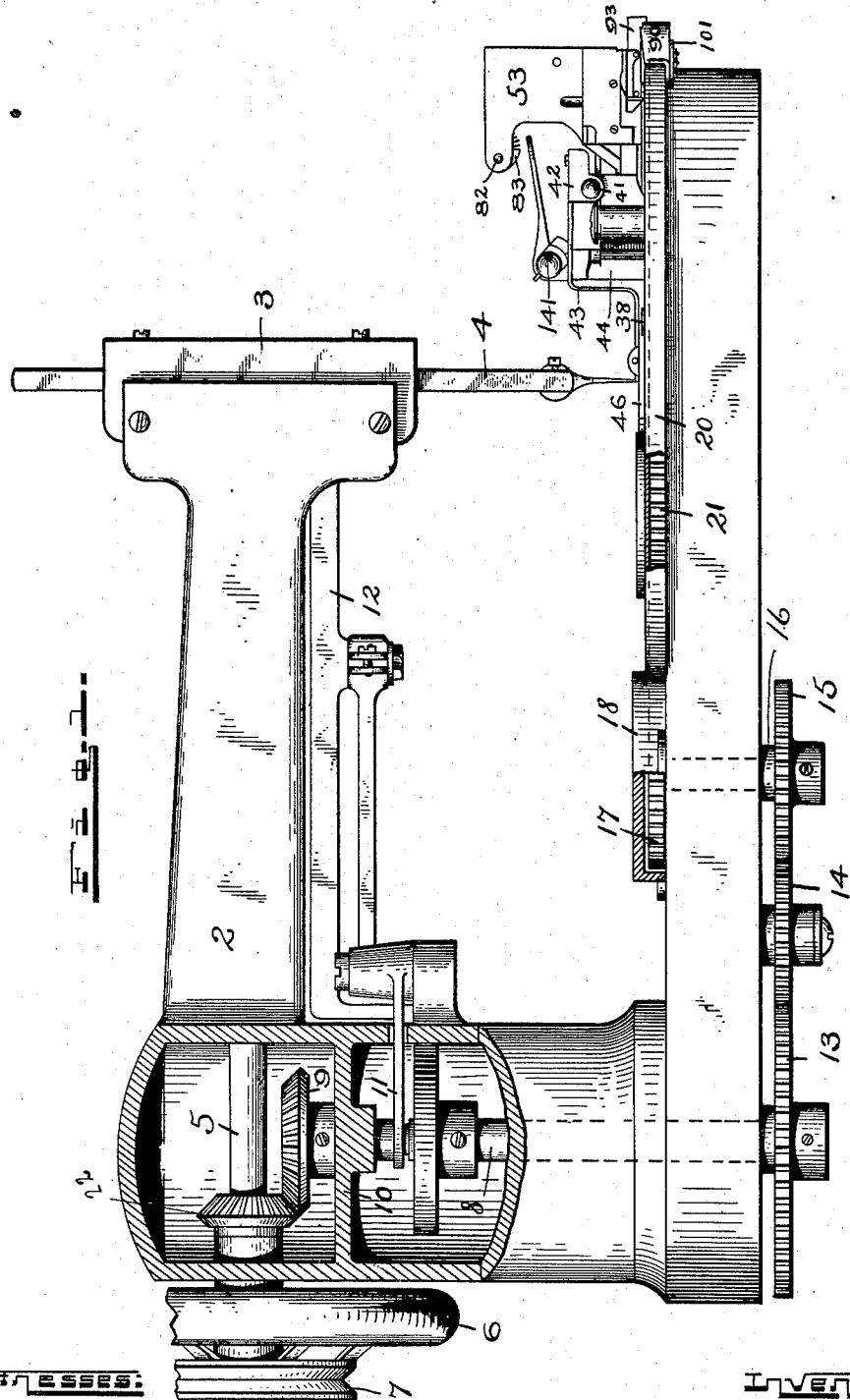
WITNESSES:
F. W. Woerner
Jula Green.
INVENTOR
Arnold G. Anderson
By O. H. Lockwood
His ATTORNEY.

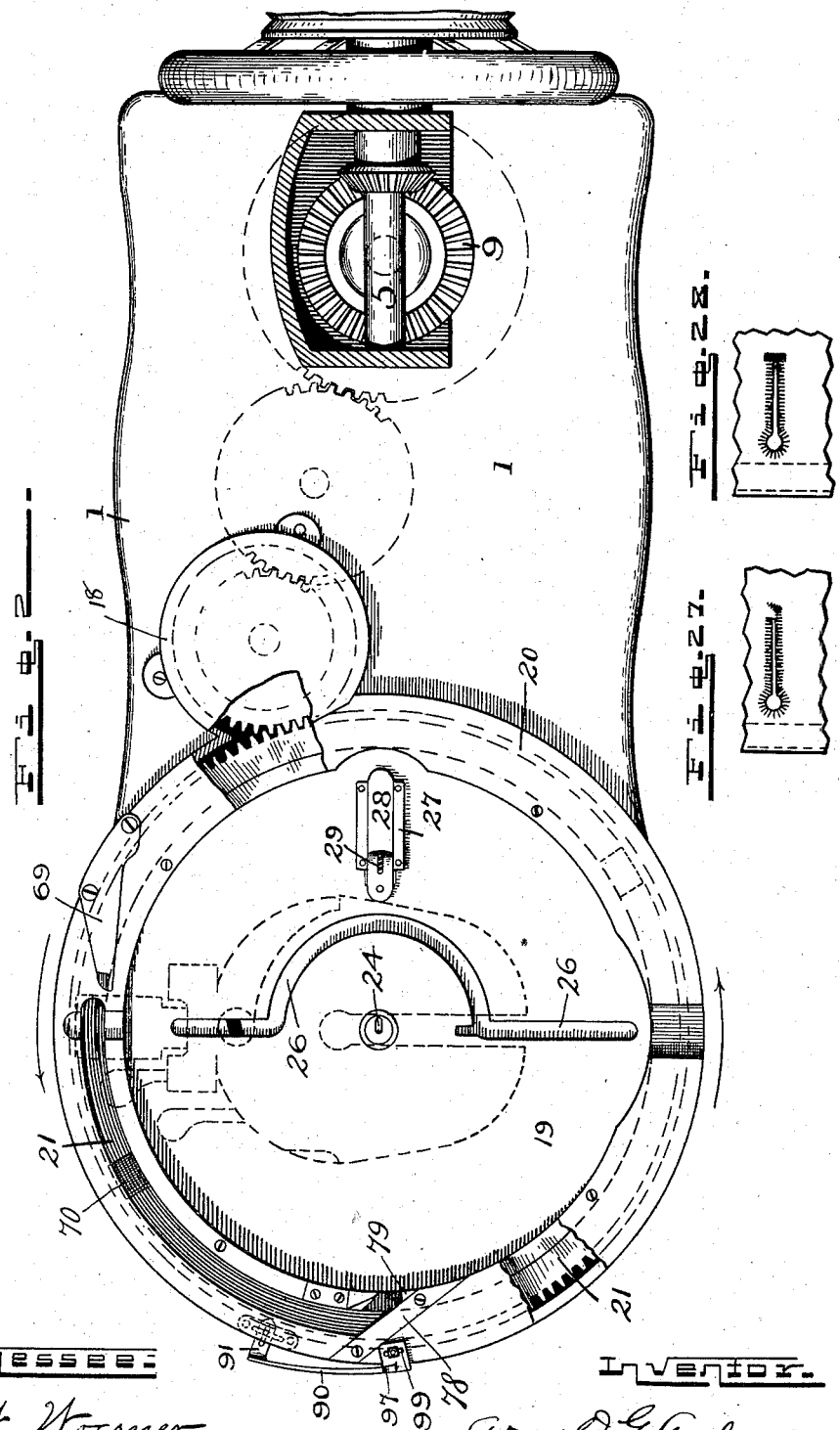

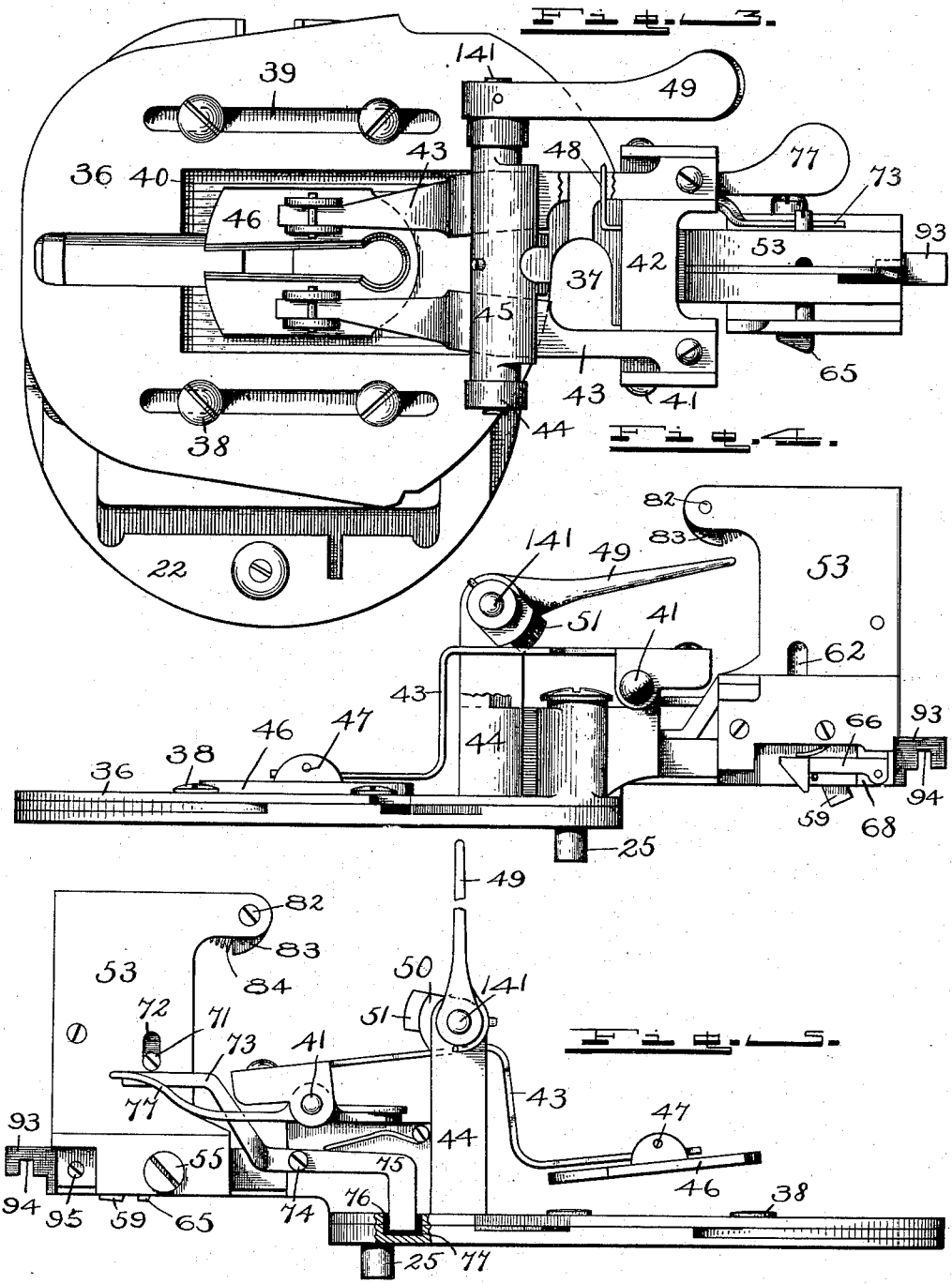

(No Model.) 6 Sheets—Sheet 4.
A. G. ANDERSON.
BUTTONHOLE SEWING MACHINE.
No. 565,713. Patented Aug. 11, 1896.
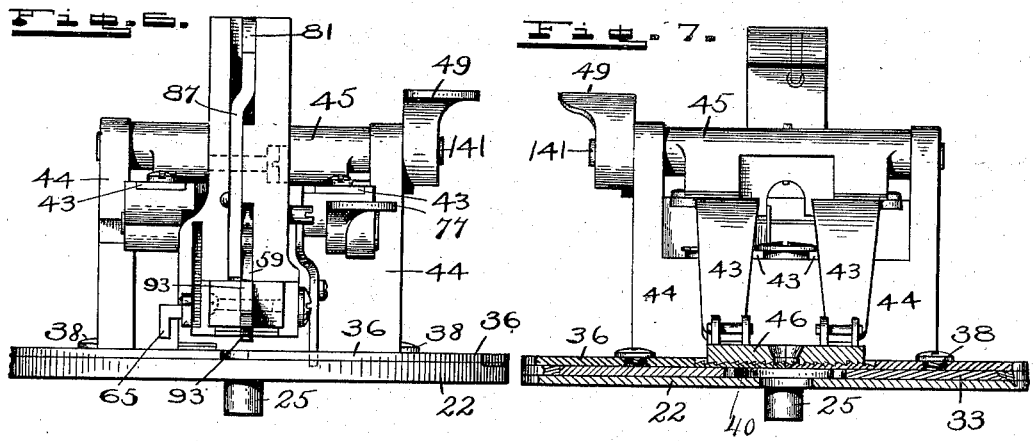
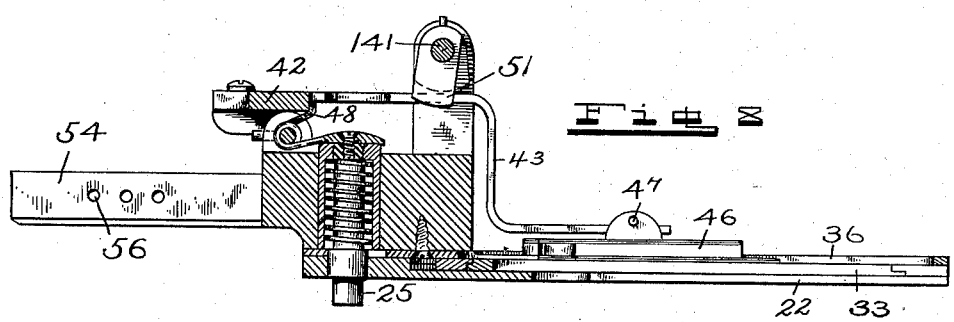
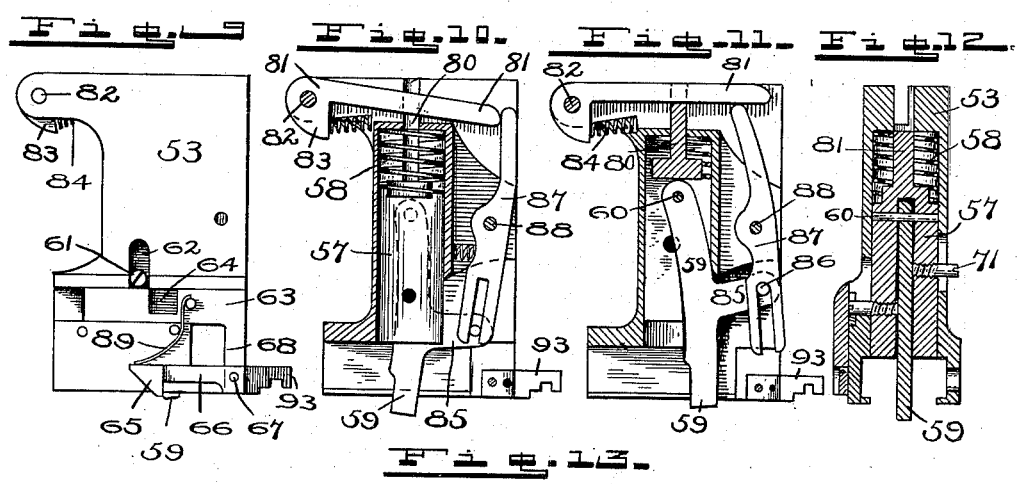
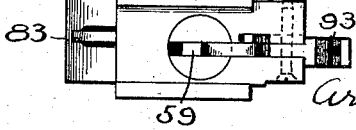
WITNESSES:
F. W. Werner.
Zula Green.
INVENTOR
Arnold G. Anderson
By V. H. Lockwood
His ATTORNEY.

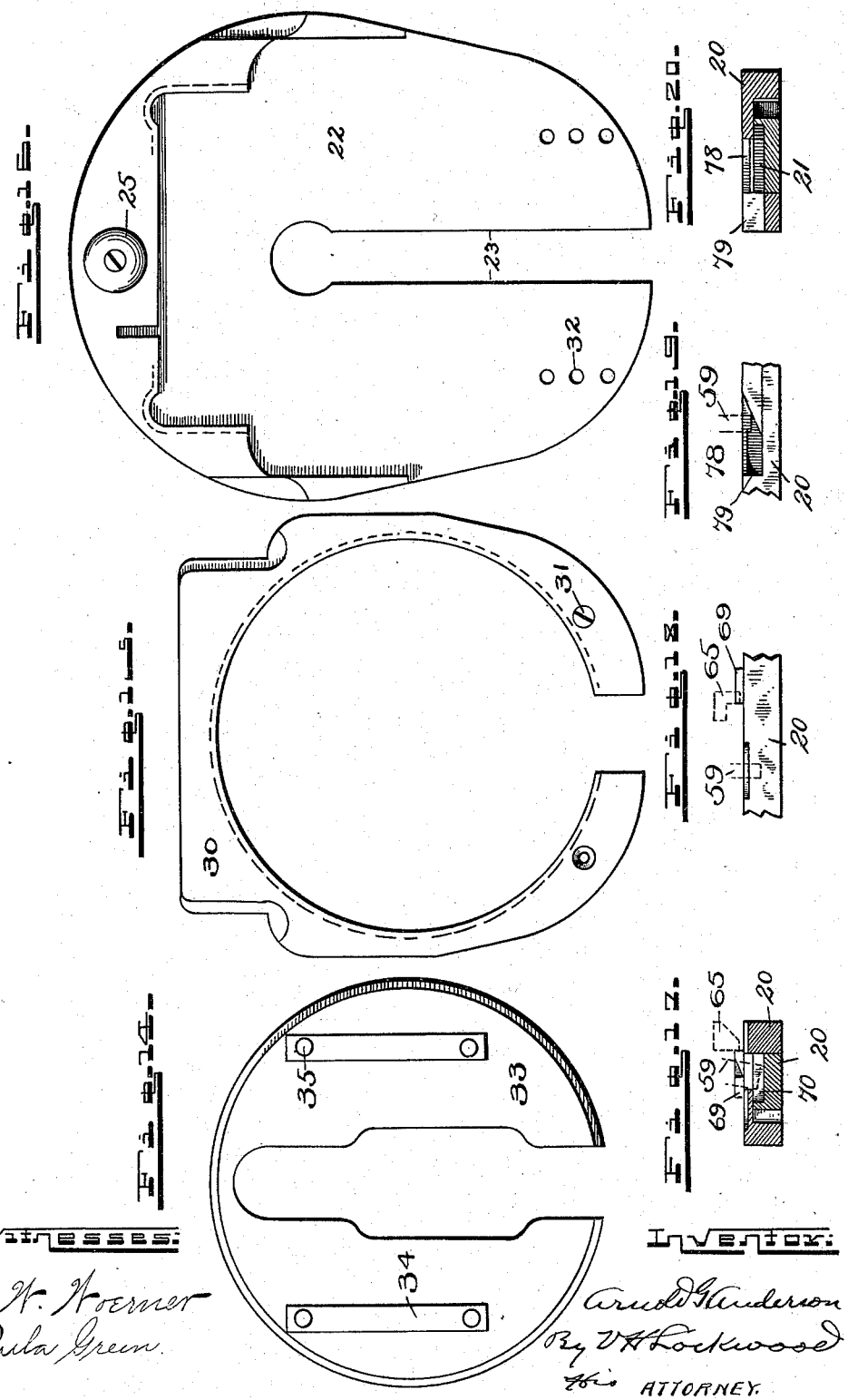

(No Model.)  6 Sheets—Sheet 6.
A. G. ANDERSON.
BUTTONHOLE SEWING MACHINE.
No. 565,713.  Patented Aug. 11, 1896.
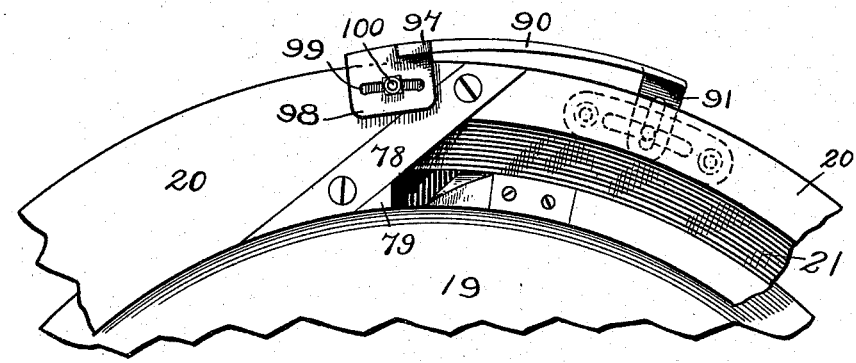
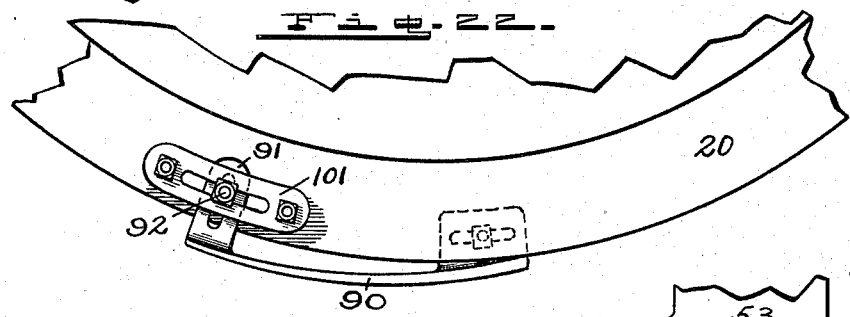
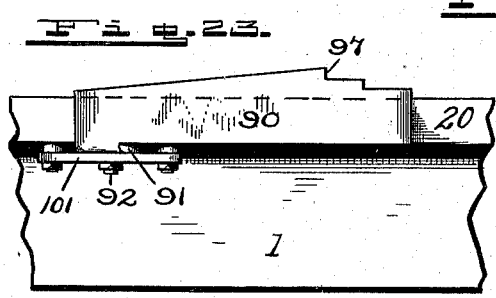
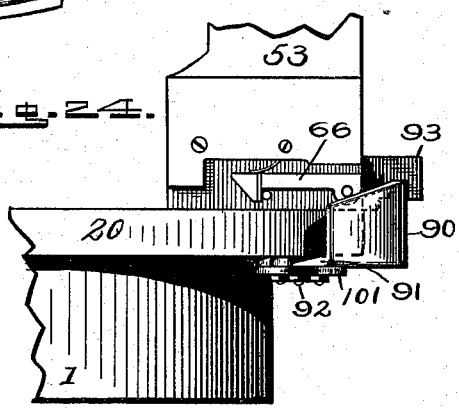
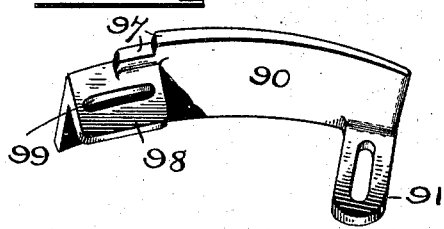
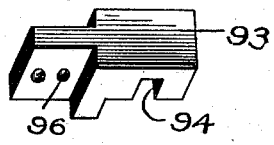
WITNESSES:
F. W. Woerner.
Zula Green.
INVENTOR.
Arnold G. Anderson
By V. H. Lockwood
his ATTORNEY.
THE NORRIS PETERS CO., PHOTO-LITHO., WASHINGTON, D. C.

UNITED STATES PATENT OFFICE.

ARNOLD G. ANDERSON, OF CHICAGO, ILLINOIS, ASSIGNOR TO GEORGE B. GASTON, OF INDIANAPOLIS, INDIANA.

BUTTONHOLE-SEWING MACHINE.

SPECIFICATION forming part of Letters Patent No. 565,713, dated August 11, 1896.

Application filed February 29, 1896. Serial No. 581,388. (No model.)

*To all whom it may concern:*

Be it known that I, ARNOLD G. ANDERSON, of Chicago, county of Cook, and State of Illinois, have invented a certain new and useful Buttonhole-Sewing Machine; and I do hereby declare that the following is a full, clear, and exact description thereof, reference being had to the accompanying drawings, in which like numerals refer to like parts.

My invention relates to an improvement in buttonhole-sewing machines whereby the tack or bar may be automatically stitched in exactly the right place and without any lump or other irregular stitches. Machines heretofore, so far as I am aware, have not succeeded in doing this, the best not being able to make the bar or tack at the right place, but the cloth will be carried too far and the machine-carrier will operate with too great irregularity, so that in the turn from the side of the buttonhole to make the bar or tack a lump-stitch, that is, several stitches upon each other, will be made, and also the bar or tack when made will extend at an angle from the line it should have taken and will fail at its end to connect up with the stitches that were first made on the side of the buttonhole.

My improvement is suited to any kind of machine in which the cloth-carrier swings about while the buttonhole is being stitched. When the bar or tack is ready to be made, my improvement will force the cloth-carrier into the proper place and will hold its heel securely, so that the machine will make perfect stitches in a straight line at right angles to the two sides of the buttonhole and extend from the stitches on one side to the stitches on the other side, where the machine first began to stitch. By this the buttonhole will be always as complete, perfect, and finished as it is possible to make it by hand.

The full nature of my invention will appear from the accompanying drawings and the description and claims following.

In the drawings, Figure 1 is an elevation of the upper portion of the sewing-machine on the side opposite the operator, parts being broken away to disclose the mechanism. Fig. 2 is a plan view of the upper portion of the machine with the arm broken away and the cloth-carrier shown in dotted lines only. Fig. 3 is a plan view of the cloth-carrier in position for making the bar or tack. Fig. 4 is a side elevation of the cloth-carrier on the left-hand side when it is in position to begin making the buttonhole. Fig. 5 is an elevation of the same on the left-hand side, this being also the side next to the operator when the cloth-carrier is in position for making the tack. Fig. 6 is a rear elevation of the cloth-carrier in the position at the beginning of the process of making the buttonhole. Fig. 7 is a front elevation of the same, the portion which holds the cloth being in cross-section. Fig. 8 is a side elevation of the cloth-carrier with a portion of the heel in longitudinal section and a portion removed. Fig. 9 is an elevation on the left-hand side of the heel of the cloth-carrier. Fig. 10 is a central longitudinal section of the heel, showing the position of the parts while the tack or bar is being made. Fig. 11 is the same, showing the position of the parts while the sides and eye of the buttonhole are being stitched. Fig. 12 is a vertical cross-section through the central part of Fig. 10. Fig. 13 is a bottom view of the heel. Fig. 14 is a plan view in detail of the revolving circular plate in the cloth-carrier. Fig. 15 is a plan view of the device in which the revolving plate moves. Fig. 16 is a plan view of the lower plate of the cloth-carrier. Fig. 17 is a cross-section of the annular casing forming part of the bed-plate at the point opposite the operator and from which the cloth-carrier makes its final throw. Fig. 18 is an inside elevation of the portion of the annular casing forming part of the bed-plate thereof (shown in Fig. 17) and at the same point. Fig. 19 is an inside elevation of the same casing at the point where the final throw or movement of the cloth carrier ceases. Fig. 20 is a cross-section at the same point looking from the rear of the machine. Fig. 21 is a plan view of the annular casing at the point where the cloth-carrier ceases its final movement, showing my attachment at that point. Fig. 22 is a bottom view of the same. Fig. 23 is an outside elevation of the same as shown in Fig. 21. Fig. 24 is an elevation of a part of the heel of the cloth-carrier and of a portion of the annular casing where the cloth-carrier stops in its final movement and my attachment thereto. Fig. 25 is a perspective of my inclined or cam-bar attachment. Fig. 26 is a perspective of the hook or finger, which I add to the rear of the cloth-carrier. Fig. 27 shows the buttonhole as made by the old machine, and Fig. 28 shows the buttonhole as made with my improvement.

Since my invention is shown here in connection with a commonly-used buttonhole-sewing machine, I will first proceed to describe the operation of the parts of the machine which are old. The various operating mechanisms are mounted upon the bed 1 of the machine. On this is the machine-arm 2, having on its end the face-plate 3, in which is mounted the needle-bar 4. Located within the arm is a needle-bar drive-shaft 5, having on its rear end the starting-wheel 6 and the sheave-pulley 7, over which a suitable belt operates which extends from some suitable source of power. At the front end of such bar is mounted any suitable mechanism for transmitting to the needle a vertical reciprocation. In the rear part of the arm is a vertical rotary shaft 8, having on its upper end a bevel-gear 9, that is engaged by the bevel-gear 22 on the needle-bar drive-shaft 5. 10 is a support secured to the framework for the vertical shaft 8 and by which it is carried. Below this support the shaft is turned down to form a cam-bearing for the bell-crank 11, that actuates the reciprocating bar 12, whereby the needle is caused to oscillate and therefore pass alternately through the buttonhole and the cloth near the buttonhole. This is no part of my invention and any suitable mechanism may be used for the purpose. By this the needle is caused to make the double stitch to be found in buttonholes, that is, the one on the face or edge of the buttonhole and the other back from the buttonhole, as is well known.

At the lower end of the vertical rotary shaft 8 is a spur-gear 13, that meshes with the spur-gear 14, and it in turn with the spur-gear 15, on the vertical rotary shaft 16, that extends up through the bed 1 and has on its upper end a spur-gear 17, which is covered by a suitable cap or covering 18. On the bed 1 of the machine, at its front end, is placed a round stationary bed-plate 19 with its center under the needle-bar. On this bed-plate the cloth-carrier moves and swings about, as will hereinafter be shown. The periphery of this bed-plate 19 is formed into an annular casing 20, within which moves an annular external gear 21. This gear 21 is driven in the direction indicated by the arrows. The ring-gear 21 can be seen in part through the slot in the upper side of a portion of the annular casing 20.

On the bed plate 19 rests the lower plate 22 of the cloth-carrier, which holds the cloth in which the buttonhole is to be sewed. The lower plate of the cloth-carrier has centrally extending almost through it, in a direction away from the operator, a slot or guideway 23, through which extends a post 24, having on its upper end a washer that holds the plate down to the bed-plate 19, and the post furnishes the pivot, as it were, about which the lower plate 22 may swing, and the post also contains the needle-holes. In the heel part of the cloth-carrier is a spring-bolt 25, which extends downward through the slot 26 in the rear portion of the lower plate 19. The swinging movement of the lower plate 22, therefore, is governed by the central post 24 and the bolt 25, moving through the slot 26, which extends, as shown, from the nearer periphery of the bed-plate 19 to a point about midway between the periphery and center of said bed-plate. Then it curves in a semicircle to the right toward the arm-post end of the machine and then extends in a straight line almost to the farther end of such bed-plate 19. Suitable mechanism which is familiar to manufacturers and operators of buttonhole-sewing machines, especially of the Singer and Houghton type, is located below the bed of the machine and driven by the vertical rotary shaft 8 to rotate or swing the cloth-carrier.

In the bed-plate 19, located between the guide-bars 27, there is a pressure-bar 28 with a round end that engages the periphery of the lower carrier-plate 22, and such sliding bar is pressed toward the same by the spiral spring 29, which is mounted within such pressure-bar. The purpose of said spring bar is to hold the cloth-carrier in proper place and prevent too much freedom of movement or play. The lower plate 22, by reason of the slot extending almost through it, has the appearance of a cloven hoof, and within its upper face there is mounted an adjustable plate 30, that is secured by the screws 31 in the holes 32. Several holes are provided for adjustment. The inner edge of this plate is flanged to form means for holding the rotary circular plate 33 down on the lower plate 22. The rotary plate has an annular extension or tongue that fits under the flange on the plate 30. Through the rotary plate a slot extends from one periphery almost to the other, which is wide enough to permit the operation of the needle. On each half of this rotary disk or plate 33 and integrally secured to it are two bars or lugs 34, having in each end threaded holes at 35.

Upon the lower carrier-plate 22 rests the foot or upper carrier-plate 36, with a heel extending therefrom. In such heel there is a recess at 37, in which fits the upper end of the spring-bolt 25, which, during part of the operation of the machine, tends to hold the said upper foot in place. It is also held down to the lower plate 22 by means of the screws 38, which screw into the threaded holes 35 in the bars or lugs 34, the heads of the bolts extending through the slots 39 and clamping said foot to the rotary plate 33 in the lower plate of the cloth-carrier mechanism. These lugs or bars 34 fit snugly in the slots, so that the upper plate is tightly secured to the rotary plate in the lower plate of the cloth-carrier. For convenience I shall hereinafter call said upper plate, combined with said rotary plate, the "cloth-carrier," and the heel of such upper plate the "heel of the cloth-carrier." The said upper plate, it is observed, is centrally cut out to permit the operation of the needle, and also to receive two loose plates 40, serrated on their upper surfaces, said plates resting upon the rotary plate 33 and held in place within the recess or centrally cut-out portion of the foot-plate 36 of the cloth-carrier.

The cloth, after the buttonhole is cut by a suitable mechanism, is laid upon the serrated plates 40 with the buttonhole between them. It is then clamped down tightly into place by the following clamping mechanism:

Pivoted in about the central portion of the rear portion of the heel of the cloth-carrier to the bolt 44 is a little framework 42, carrying on each of its ends forwardly-extending arms 43, whose inner edges are inclined toward each other at their middle portion, and which are bent down over the framework 44 of said cloth-carrier. These carry on their ends a couple of feet 46, centrally pivoted at 47, so as to have a slightly-vertical oscillatory movement. These clamping-feet are serrated on their lower faces, where they engage the cloth, and their inner edges are so formed that the space between said clamping-feet is substantially the shape of the buttonhole, although much larger. These, in connection with the serrated plates 40, hold the cloth, and therefore the buttonhole, in place for the action of the needle. The bolt 41 is provided with a coil-spring 48. The end of such spring engages the forward edge of the frame-piece 42, thereby causing the clamping-feet 46 to be elevated normally. Said clamping-feet are pressed down into engagement with the cloth by the clamping-bar 45, pivotally mounted in the posts on the framework 44 and actuated by the crank or finger-piece 49. The under face of this clamping-bar 45 is made oval or cam-shaped at 50 to engage the upper surface of the forwardly-extending arms 43 and press them down, and said lower surface is also provided with two extensions 51, that, by engaging the inner edges of said forwardly-extending arms 43, which, as has been explained, are inclined inward, press said arms, and therefore the feet, apart as the feet are being pressed down on the cloth. The purpose of this spreading movement is to separate the sides of the buttonhole, so as to give the needle room to work and make the stitches along the edge of the buttonhole.

In the heel 53 of the cloth-carrier there are various trip mechanisms mounted in the framework, which at its rear is centrally cut out to receive said trip mechanism, so that it consists, practically, of two vertical side plates, integral with each other at their front and secured to the rearwardly-extending arm 54, as seen in Fig. 8, by means of the screw 55 passing through the holes 56 in said arm. There are a plurality of these holes whereby the heel-framework may be adjustably mounted. Within said heel there is a chamber for the plunger 57, that is pressed downwardly normally by the spiral spring 58, mounted upon it in said chamber. Said plunger is centrally recessed from the bottom almost to the top, as seen in Fig. 12, to receive the trip 59, which is at its upper end secured to said plunger on the pivot 60. Its lower end extends, while the cloth-carrier is carrying the cloth for stitching the sides and eye of the buttonhole, flush with the lower part of the heel-framework. It is held in such position by the pin or screw 61, which is fastened in the plunger on one side, and is vertically movable in the slot 62 in the side of the framework of the heel. Such pin rests upon the sliding plate 63, as seen in Figs. 9 and 12, whereby the plunger and trip 59 are supported in their upward position, as seen in Fig. 11. Said plate 63 is provided on its upper side with a recess or notch 64, so that when the plate is slid inward the pin or screw 61 drops down into the notch, whereby the plunger and trip 59 can be pushed downward by the spring above the plunger into the position shown in Fig. 10.

The plate 63 is slid inward to bring about the result above described, in the following manner and by the following means: When the cloth-carrier has carried the cloth far enough to enable the buttonhole to be stitched on its inner side, as has been described, it is swung around to form the eye, and as the heel swings about, at that stage of the process, upon the annular casing 20 the head 65 of the trip 66, which is pivoted at 67 to the downwardly-extending arm 68 of the sliding plate 63, is engaged by the inner edge of the stationary guide-plate 69, that is secured to the casing 20, as seen in Fig. 2. The inner edge of such plate is inclined inward in the direction that the wheel is moving, and it pushes the trip 66 inward, and, by reason of the connection of the trip with the plate 63, pushes the latter inward until the pin or screw 61 in the plunger drops down into the notch 64 of such sliding bar, as has been heretofore described. Then the trip 59 extends below the heel. While the cloth-carrier and heel is pushed backward as the second side of the button is being stitched, such trip 59 comes in engagement with the rapidly-revolving ring-gear 21. Such ring-gear is provided in its upper surface with a notch or catch 70, (seen in Fig. 2,) and by this connection said ring readily throws or swings the heel of the cloth-carrier around the quadrant of a circle, so that the cloth-carrier will extend at a right angle to its previous position. Before this throw, however, can be effected it is necessary to disengage the upper plate 36 of the cloth-carrier from the lower one 22, because the lower one cannot be swung around to make the tack or bar, as it is held by the spring-bolt 25, extending through the slot 26, from any further rotation. This is effected as follows: When the trip 66 has been actuated and the plunger 57, together with the trip 59, has been pushed downward, a pin or screw 71, on one side of the plunger and secured to it, moves up and down through the slot 72 in the framework of the heel. This pin in its downward movement, before the trip 59 has been engaged by the ring-gear 21, engages and presses down the rear end of the lever 73, which is centrally pivoted at 74 and has a downward extension or trip 75, which extends through a slot 76 in the upper plate of the cloth-carrier and into a notch 77 in the lower plate thereof, so that it locks the two plates together in the first part of the process, but when the rear end of the lever 73 is pressed down, as I have explained, the trip 70 is elevated and caused to disengage said lower plate, so that the upper plate, or cloth-carrier proper, can be swung around independent of the lower plate by reason of said upper plate being mounted on the rotary plate 33, which has heretofore been described and on whose surface the cloth-holders are located. At this point I will add that the spring-bolt 25 is lifted out of the slot 26 in the bed-plate 19 in the slot 26 by the lever 77, which is centrally pivoted on the bolt 41, whose inner end engages the head of the spring-bolt 25. By operating the lever 77 the spring-bolt is readily lifted, and then the whole cloth-carrier, lever, plate, and all may be returned to its original position and reset for sewing the next buttonhole.

As the heel of the cloth-carrier is suddenly swung or thrown around, after the second side of the buttonhole has been stitched, to the position at a right angle to what it had occupied prior thereto, the trip 59, which has been engaged by the notch 70 in the ring-gear, engages the inclined surface of the plate 78, secured to and embedded in the annular casing 20. Said surface is inclined inward, so that the trip is pushed inward until it disengages itself from the ring-gear and comes in contact with and is stopped by the square surface or stop 79, made by cutting out a portion of the inner edge of the casing 20 at that point. That square-faced stop limits the movement of the heel of the carrier and holds it from further movement in a forward direction while the bar or tack is being stitched. While the heel of the carrier is being thrown about and the stitch is being made, the position of the trip 59 and the associated mechanism is substantially that seen in Fig. 10. Previous to said throw, that is, while the two sides and the eye of the buttonhole are being stitched, the position is that shown in Figs. 9 and 11. The plunger 57 has on its upper end an upwardly-extending stem 80, that operates in a vertical aperture and engages the under side of the trip-lever 81, which is pivoted at its front end at 82 to the framework and has a heel 83, that is engaged by the spiral spring 84. The tendency of such spring is to throw the rear end of the lever downward, while the stem of the plunger pushes it upward, when said plunger is raised. The trip-lever 59 has near its middle a rearwardly-extending arm 85, that is provided with a pin 86, that operates in and extends through a slot in the lower end of the trip-lever 87, that is pivoted centrally at 88, and which bears against the lower part of said trip-lever 87 and tends to throw its lower end rearward and its upper end forward. When the trip 59 is elevated, as seen in Fig. 11, it throws back the lower end of the trip-lever 87 and its upper end slips under the rear end of the trip-lever 81. When, however, the plunger is permitted to move downward and carry with it the trip 59, the lower end of the trip-lever 87 is drawn inward, so that its upper end escapes the end of the trip-lever 81, and the end of the trip-lever 81 drops down to a position in front of the upper end of the trip-lever 87, as seen in Fig. 10, whereby the lower end of the trip 59 is prevented from having a rearward movement until after it has been elevated, and when it is elevated the plunger likewise is elevated and the stem on the upper end pushes the trip-lever 81 upward out of engagement with the trip-lever 87, allowing the parts to assume their original position, as seen in Fig. 11. After the buttonhole has been sewed the heel is swung around backward the reverse of the movement it made in the throw just described, and while doing so the lower end of the trip 59 engages the inclined cam-surface on the inner edge of the casing 20, as seen in Figs. 2, 19, and 21, whereby the trip 59 is pushed upward until it rides on top the casing 20 and is thus forced into the position shown in Fig. 11. When said trip is pushed upward, the plunger 57, to which it is secured, is likewise pushed upward and the pin 61 is elevated above the sliding plate 63, whereupon the spring 89 pushes or slides said sliding plate 63 rearward, as seen in Fig. 9, so that said sliding plate thereafter continues to support the plunger and hold the trip 59 up out of engagement with anything.

In the process of sewing the buttonhole after the same has been cut the cloth-carrying mechanism is pushed forward until it is in proper place to begin the stitching at a point on one side of the buttonhole. During the stitching of the first side of the buttonhole the machine carries the cloth-carrier forward until the needle reaches the eye of the buttonhole. Then the cloth-carrier is swung around as the spring-bolt 25 passes through the semicircular portion of the slot 26, and during such swinging about of the cloth-carrier the needle stitches the eye of the buttonhole. Then the cloth-carrier moves backward away from the operator, as well as the needle, and carries the cloth in that direction while the buttonhole is being stitched. As the carrier approaches the limit of its swinging movement, heretofore described, the trip 66 engages the inclined inner edge of the guide-plate 69, secured to the top side of the casing 20. The trip 66, through the mechanism heretofore described, causes the trip 59 to be pushed downward, so as to engage the catch or recess 70 in the ring-gear 21, when said trip shall be carried back in engagement with the said ring by the backward movement of the cloth-carrier as the last side of the buttonhole is being stitched, and then the throw heretofore described is made. In this last movement the lower carrier-plate 22 did not rotate as has been described, but only the rotary plate 33, which is mounted in said lower plate. Said lower plate, when the quarter-throw is made, has not reached its limit of movement rearward and outward, but it continues so to move. Since the cloth has been turned at right angles to the direction of the continued movement of the lower plate, the continued operation of the sewing-machine will cause the needle to make the stitches across the end of the buttonhole, which row of stitches is called the "bar" or "tack."

The foregoing mechanism is old and familiar to manufacturers and operators of buttonhole-sewing machines. Said machine, however, does not make the bar or tack perfect, but leaves it in the condition shown in Fig. 27, i. e., the throw of the cloth-carrier is such that the second side of the buttonhole is stitched farther inward than the first side, and therefore the bar or tack will not connect the two sides, but will miss the first side by some distance. Furthermore, the throw of the carrier in the latter part of the operation is violent, causing considerable oscillation of the same. Therefore the cloth is oscillated to and fro, causing the needle to make irregular stitches and especially to make a lump-stitch at the turn, that is, make several stitches upon each other. Furthermore, the heel of the carrier is not held securely in place after it has been thrown around in the final position, and hence it oscillates or fails to assume the right position, whereby the bar or tack will not be straight, and especially will extend off at an angle to a straight line across the end of the buttonhole. This renders the buttonhole very imperfect and incomplete and shows a lack of finish that is very apparent and requires as much handwork to complete as was required by the old buttonhole-sewing machines that pretended to make no tack at all. My improvement is to overcome this and to perfect the operation of the machine so as to make a finished and complete buttonhole as fine as any as could be made by hand, substantially like what is shown in Fig. 28. To this end I secure in any suitable manner on the left-hand side of the casing 20 or bed-plate 19 any suitable guide that will tend to push the carrier inward, or, if necessary, to pull it outward, in order that the bar may be made to connect up with the ends of the stitches on the two sides. In the machine herein shown I secure what I call a "cam-plate" 90 to the outer edge of the annular casing. It is observed that this cam plate or bar is inclined inward in the direction in which the cloth-carrier is thrown or moved. The heel of the carrier engages this inclined bar and is, therefore, pushed inward, so as to enable the machine to make the bar in the right place, as shown in Fig. 28, instead of the buttonhole shown in Fig. 27. The amount of shifting inward depends, of course, upon the special machine and its condition of wear. Hence I make such cam bar or plate adjustable. On the end farthest from the operator, on the lower side of said bar or plate, is placed an inwardly-extending ear 91, having a slot through which the screw 92 extends, so that I can move the end of said bar or plate inward or outward by loosening said screw, moving the plate, and then tightening the screw. It is obvious that such cam-surface, whereby the carrier may be pushed inward to its proper place to make the bar or tack, may be otherwise made or secured to the bed-plate or casing.

Instead of permitting the heel of the carrier merely to engage the said cam plate or bar 90 and be pushed inward, I preferably provide the extra arm or finger 93, which is secured to the heel of the carrier by the bolt 95 through the hole 96. Such arm or finger has in its under side a notch 94, that engages the cam-bar 90, so that while the inner face of such notch presses against the inner face of such bar, whereby the carrier is pushed inward into place, the outer face also engages the outer surface of such cam-bar, and prevents the cloth-carrier being thrown too far inward. That is, the notch in said arm 93 enables the cam-plate 90 not only to push the cloth-carrier inward, but to hold it in exactly the right position and prevent any longitudinal movement of the carrier whatsoever, so that the location of the bar or tack can be absolutely and accurately predetermined, and the machine cannot possibly vary the location thereof. It is clear that if there should be a machine where the carrier would have to be pushed outward instead of inward, in order to bring the bar or tack in the right place all that would be necessary to effect the desired change would be to change the direction of the incline of the bar 90 so that it would incline outward in the direction in which the heel is swung, instead of inward, and the hook or finger 93 would cause said cam-bar 90 to draw the cloth-carrier somewhat away from the center and laterally, so that the tack or bar would be made in the proper place with reference to the two sides of the buttonhole.

In order to adapt my mechanism to different machines and the same machines in different stages of wear, I so make my arm or finger 93 that it may be adjusted inward or outward. To this end I place a series of holes 96 in it through which the screw 95 passes. By this I can set the arm farther out or farther in, as desired.

I have said that the difficulty which arises from the old machine was caused by the shaky or oscillatory and irregular movement of the cloth-carrier when it is thrown instantaneously around the quarter-circle in its last throw to form the tack. In the operation of the old machine the heel is clearly seen to quiver considerably, and that of course causes the front part of the carrier to oscillate or quiver, moving the cloth, therefore, laterally to and fro instead of holding the cloth in exactly the right place. This causes the tack or bar to run off at a tangent to the proper line to form lump-stitches, especially at the turn from the side of the buttonhole to the tack or bar. To overcome this, I provide the following mechanism: The cam-bar 90 is provided with a stop or shoulder 97 on its upper edge, over which the heel of the cloth-carrier is thrown in the last movement of the final quarter-circle throw, which has been described. The force of the throw causes the heel to pass over the said shoulder or stop and when the trip 59 engages the stop 79, heretofore described, the said shoulder or stop 97 prevents the backward movement or rebound of the same. The heel thus is held firmly between these two stops, so that it cannot go farther or move backward, but the stops do not prevent the proper feed of the cloth by the cloth-carrier while the bar or tack is being stitched.

Since the exact location of the stop or shoulder 97 may differ in different machines and may differ as the machine suffers from use and wear, I make the same adjustable as follows: At the end of the cam-bar 90 that is next to the operator I have on its upper edge an ear 98, having in it a slot 99, extending parallel with the cam-bar. Through this slot I place a screw 100 and secure it to the annular casing 20. The other end of the cam-bar is rendered longitudinally adjustable by means of the longitudinally-slotted bar 101, secured to the under side of the annular casing, and to that slotted bar I secure the laterally-slotted ear 91. It is thus that my cam-bar 90 is both longitudinally and laterally adjustable, so that not only its incline inward may be adjusted, but the location of the stop on it may be also adjusted. It is perfectly apparent also that the stop 97 may be otherwise secured to the casing 20 or bed-plate 19 to hold the heel of the carrier exactly in place; but what I have shown I consider preferable to any other of which I am aware.

I have heretofore stated that the heel of the cloth-carrier is swung about with great force, so that when the trip 59 engages the stop 79, even if the machine is provided with the stop 97, the jar will cause the front portion of the carrier to be shaken and irregular in its feed of the cloth, so as to make lump and irregular stitching. In order to remedy this difficulty, I make the upper edge of the cam-bar 90 inclined upward in the direction in which the heel of the carrier is swung about, and the incline extends to the stop or shoulder 97. One purpose of this incline is to break the force of the throw given to the heel, so that it will not be stopped with such violence and suddenness as to cause the difficulty I have heretofore described. Another object of said upward incline is to partially or wholly disengage the trip 59 from the ring-gear 21 before it reaches the inclined plate 78 by the heel of the cloth-carrier being uplifted somewhat. By locating such upward incline in advance of the inclined plate 78 and stop 79 it is clear that the violence of the stopping of the carrier will be greatly reduced. Another object of the upward incline of the bar 90 is to prevent the heel striking the end of such bar.

What I claim as my invention, and desire to secure by Letters Patent, is—

1. In a buttonhole-sewing machine, the combination with a suitable bed-plate, and a cloth-carrier that rotates thereon to present the buttonhole to the needle while it is being stitched, of a guiding bar or plate secured to the bed-plate and having a vertical surface so inclined in the direction the carrier moves and so located as to engage the carrier when the tack or bar of the buttonhole is to be made and force the carrier over so that said tack or bar will be made exactly over the ends of the sides of the buttonhole.

2. In a buttonhole-sewing machine, the combination with a suitable bed-plate, and a cloth-carrier that rotates thereon to present the buttonhole to the needle while it is being stitched, of a guiding bar or plate adjustably secured to the bed-plate and so adjusted that its vertical surface will be inclined in the direction that the carrier moves and so located as to engage the carrier when the tack or bar of the buttonhole is to be made and to force the carrier over so that said tack or bar will be made exactly over the ends of the sides of the buttonhole.

3. In a buttonhole-sewing machine, the combination with a suitable bed-plate, a cloth-carrier that rotates thereon to present the buttonhole to the needle while it is being stitched, and a stop to limit the forward swing or rotation of said cloth-carrier when the tack or bar is to be made, of a stop or shoulder to engage the heel of the carrier and prevent any rebound of the same and in combination with the other stop to hold said heel in place.

4. In a buttonhole-sewing machine, the combination with a suitable bed-plate, a cloth-carrier that rotates thereon to present the buttonhole to the needle while it is being stitched, and a stop to limit the forward swing or rotation of the carrier when the tack or bar is to be made, of an adjustably-mounted stop or shoulder to engage the heel of the carrier and prevent its rebound.

5. In a buttonhole-sewing machine, the combination with a suitable bed-plate, a cloth-carrier that rotates thereon, and a stop to limit the forward swing or rotation of the carrier when the tack or bar is to be made, of means for checking or breaking the force of the heel in the latter part of its swing into position to make the tack or bar, for the purpose of preventing the oscillation of the cloth-carrier when the heel is stopped in said movement.

6. In a buttonhole-sewing machine, the combination with a suitable bed-plate, a cloth-carrier that rotates thereon to present the buttonhole to the needle while it is being stitched, and a stop to limit the forward swing or rotation of the cloth-carrier when the tack or bar is to be made, of a bar or plate secured to the bed-plate and having its upper edge inclined upward in the direction in which the heel of the carrier moves and so located that the heel of the carrier will engage said upper edge, and a stop or shoulder at the end of said incline to prevent the rebound of the heel of the carrier when its movement is finally checked.

7. In a buttonhole-sewing machine, the combination with a suitable bed-plate, a cloth-carrier that rotates thereon to present the buttonhole to the needle while it is being sewed, and a stop to limit the forward swing or rotation of the carrier, of a bar or plate whose upper edge is inclined upward in the direction the heel of the carrier moves and mounted where the heel of the carrier will engage such upper edge and which is provided with a stop or shoulder at the end of the incline to prevent the rebound of the heel of the carrier when it is stopped, and means for securing such plate or bar to the bed-plate so that it will be longitudinally adjustable.

8. In a buttonhole-sewing machine, the combination with a suitable bed-plate, and a cloth-carrier that rotates thereon, of an inclined bar or plate secured to the edge of the bed-plate for the purpose of forcing the cloth-carrier into proper position for making the bar or tack in the right place, and a notched finger extending rearward from the heel of the cloth-carrier to engage such bar or plate.

9. In a buttonhole-sewing machine, the combination with a suitable bed-plate, and a cloth-carrier that rotates thereon, of an inclined bar or plate secured to the edge of the bed-plate for the purpose of forcing the cloth-carrier into proper position for making the bar or tack in the right place, and a notched finger adjustably mounted in the heel of the cloth-carrier so that its rearward extension may be adjusted to engage the edge of such bar or plate.

In witness whereof I have hereunto set my hand this 22d day of February, 1896.

ARNOLD G. ANDERSON.

Witnesses:
   IDA H. TODD,
   WALTER BARNES.